United States Patent [19]
Shimada

[11] Patent Number: 5,982,765
[45] Date of Patent: Nov. 9, 1999

[54] TIME DIVISION MULTIPLE ACCESS RADIO DATA COMMUNICATION METHOD

[75] Inventor: Hideaki Shimada, Tokyo, Japan

[73] Assignee: NEC Corporation, Tokyo, Japan

[21] Appl. No.: 08/806,421

[22] Filed: Feb. 26, 1997

[30] Foreign Application Priority Data

Feb. 26, 1996 [JP] Japan ..................................... 8-038160

[51] Int. Cl.$^6$ .................................................. H04J 11/04
[52] U.S. Cl. .......................................... 370/347; 370/461
[58] Field of Search .................................... 370/336, 337, 370/345, 346, 347, 442, 443, 458, 459, 461, 462, 447; 340/825.5, 825.07, 825.08, 825.17

[56] References Cited

FOREIGN PATENT DOCUMENTS

| | | |
|---|---|---|
| 60-217742 | 10/1985 | Japan . |
| 64-24641 | 1/1989 | Japan . |
| 2-52537 | 2/1990 | Japan . |
| 4-88732 | 3/1992 | Japan . |
| 4-372235 | 12/1992 | Japan . |
| 6-85725 | 3/1994 | Japan . |
| 6-164492 | 6/1994 | Japan . |

*Primary Examiner*—Chi H. Pham
*Assistant Examiner*—Maikhanh Tran
*Attorney, Agent, or Firm*—Sughrue, Mion, Zinn, Macpeak & Seas, PLLC

[57] ABSTRACT

The object of the present invention is to provide a time division multiple access radio data communication method wherein a radio time slot can be utilized effectively. In order to carry out data communication between data terminal equipment 1a connected to base station equipment 1 and a plurality of predetermined data terminal equipment 10a, 11a, 12a connected to those out station equipment 10, 11, 12 which face base station equipment 1, common radio time slot TS0 is allocated fixedly, and the plurality of predetermined data terminal equipment 10a, 11a, 12a send out request to send signals a0, a1, a2 at timings which do not overlap with each other. Then, out station equipment 10, 11, 12 which receive request to send signals a0, a1, a2 sent out from data terminal equipment 10a, 11a, 12a send back, when they are ready to send out data signals to base station equipment 1 using common radio time slot TS0 allocated thereto, clear to send signals b0, b1, b2 to data terminal equipment 10a, 11a, 12a which have sent out request to send signals a0, a1, a2, whereafter data terminal equipment 10a, 11a, 12a which receive clear to send signals b0, b1, b2 sent back from out station equipment 10, 11, 12 send out data signals to out station equipment 10, 11, 12.

4 Claims, 3 Drawing Sheets

TIME DIVISION MULTIPLE ACCESS RADIO DATA COMMUNICATION METHOD

BACKGROUND OF THE INVENTION

1. Field of the Invention

The present invention relates to a time division multiple access radio data communication method, and more particularly to a time division multiple access radio data communication method wherein radio communication channels are allocated fixedly to carry out multiple access data communication.

2. Description of the Related Art

Generally in a radio system in which multiple access communication is carried out, 1:N time division multiple communication is carried out between a single base station equipment and a plurality of out station equipment which face the base station equipment. In this instance, particularly where the system is of the type in which both telephone communication and data communication are involved, in the telephone communication, channel allocation control is carried out by a demand assign method wherein, only when a call is generated in the base station equipment or one of the out station equipment, a radio communication channel is allocated between the base station equipment and the out station equipment. On the other hand, in the data communication, channel allocation control is carried out by a pre-assignment method wherein a radio communication channel by which data communication is to be carried out is allocated fixedly in advance between a data terminal equipment connected to the base station equipment and another data terminal equipment connected to each out station equipment facing the base station equipment.

FIG. 1 is a view illustrating a conventional time division multiple access radio data communication method, and FIG. 1A is a block diagram showing a conventional example of a time division multiple access radio data communication system and FIG. 1B is a diagrammatic view illustrating a state of radio time slots of the conventional time division multiple access radio data communication system.

The conventional time division multiple access radio data communication method shown in FIG. 1A includes base station equipment 1, a plurality of data terminal equipment 1a, 1b and 1c connected to base station equipment 1, a plurality of out station equipment 10, 11 and 12 which face base station equipment 1 with radio, and data terminal equipment 10a, 11a and 12a connected to out station equipment 10, 11 and 12, respectively. In the downward from the base station equipment to the out station equipment, data communication is carried out by the TDM method, and in the upward from the out station equipment to the base station equipment, data communication is carried out by the TDMA method. Here, operation when data terminal equipment 1a and data terminal equipment 10a, data terminal equipment 1b and data terminal equipment 11a, and data terminal equipment 1c and data terminal equipment 12a carry out data communication in respective facing relationships between each other is described.

First, for the individual facing data terminal equipment, radio time slots to be used as radio communication channels are allocated fixedly in advance. That is, radio time slot TS0 is allocated fixedly to data terminal equipment 1a and data terminal equipment 10a, radio time slot TS1 is allocated fixedly to data terminal equipment 1b and data terminal equipment 11a, and radio time slot TS2 is allocated fixedly to data terminal equipment 1c and data terminal equipment 12a. Since radio time slots TS0, TS1 and TS2 are allocated at different positions which do not overlap with each other on a time basis as shown in FIG. 1B, data signals transmitted using those time slots do not interfere with each other at all. If a call is generated in any data terminal equipment in the system, then since different radio time slots are allocated to the different data terminal equipment, data communication can be carried out between the two facing data terminal equipment without fail.

In data transmission in the downward, data signals sent out from data terminal equipment 1a, data terminal equipment 1b and data terminal equipment 1c are inputted to base station equipment 1, by which they are multiplexed. Thereafter, the multiplexed data signals are transmitted to out station equipment 10, out station equipment 11 and out station equipment 12 using the TDM method. That is, the data signal from data terminal equipment 1a is multiplexed for radio time slot TS0, the data signal from data terminal equipment 1b is multiplexed for radio time slot TS1 and the data signal from data terminal equipment 1c is multiplexed for radio time slot TS2, and the thus multiplexed data signals are sent out to the respective individual out station equipment. It is to be noted that quite the same data signal is sent out from the base station equipment to the individual out station equipment. In each of the out station equipment, only a data signal addressed to the out station equipment itself is selectively demultiplexed and taken out, and the data signal is sent out to a data terminal equipment connected to the out station equipment. That is, the data signal multiplexed for radio time slot TS0 is demultiplexed by out station equipment 10 and sent out to data terminal equipment 10a, the data signal multiplexed for radio time slot TS1 is demultiplexed by out station equipment 11 and sent out to data terminal equipment 11a, and the data signal multiplexed for radio time slot TS2 is demultiplexed by out station equipment 12 and sent out to data terminal equipment 12a.

In data transmission in the upward, data signals from the data terminal equipment connected to the out station equipment are multiplexed for the radio time slots individually allocated thereto by the out station equipment, and sent out as burst signals to the base station equipment using the TDMA method. That is, the data signal from data terminal equipment 10a is inputted to out station equipment 10 and multiplexed for radio time slot TS0 and is sent as a burst signal to the base station equipment 1. Similarly, the data signal from data terminal equipment 11a is inputted to out station equipment 11 and multiplexed for radio time slot TS1 whereas the data signal from data terminal equipment 12a is inputted to out station equipment 12 and multiplexed for radio time slot TS2 and respective signals are sent as burst signals to base station equipment 1. In the base station equipment, the data signals from the individual out station equipment are individually demultiplexed and taken out, and the data signals are sent out to the individually corresponding data terminal equipment connected thereto. That is, the data signal multiplexed for radio time slot TS0 is sent out to data terminal equipment 1a, the data signal multiplexed for radio time slot TS1 is sent out to data terminal equipment 1b, and the data signal multiplexed for radio time slot TS2 is sent out to data terminal equipment 1c.

The operation described above is carried out, when data signals are sent out from the data terminal equipment, irrespective of whether or not such control signals as a request to send signal or a clear to send signal accompany them.

It is to be noted that, for convenience of description, in FIG. 1A, the number of out station equipment is 3 and the number of data terminal equipment connected to each out station equipment is 1, and those elements such as circuits and signals lines which are not particularly significant are omitted.

In the conventional time division multiple access radio data communication method described above, radio time slots to be used as radio communication channels are allocated fixedly in advance and used between individually facing data terminal equipment. Therefore, the conventional time division multiple access radio data communication method has a problem in that, where a plurality of data terminal equipment are included in a radio communication system, even when data communication is not actually being carried out with those data terminal equipment, a plurality of radio time slots are occupied, and particularly where the amount of data communication is low or the data transmission amount is small or else data communication is carried out only periodically or intermittently, the efficiencies of utilization of the radio time slots is low.

Further, the conventional time division multiple access radio data communication method has another problem in that, where the base station equipment requires a number of data terminal equipment and interface units therefore equal to the number of data terminal equipment connected to the individual out station equipment, and the structure of the system will become large.

SUMMARY OF THE INVENTION

Taking the foregoing into consideration, it is an object of the present invention to provide a time division multiple access radio data communication method by which a radio time slot can be utilized effectively.

A time division multiple access radio data communication method of the present invention is a time division multiple access radio data communication method wherein, in a time division multiple access radio data communication system which includes a single base station equipment (1), a plurality of out station equipment (10, 11, 12) and data terminal equipment (1a, 10a, 11a, 12a) connected to the base station equipment (1) and the out station equipment (10, 11, 12) and in which multiple access data communication is possible, data signals are transmitted from the data terminal equipment (10a, 11a, 12a) connected to the out station equipment (10, 11, 12) to the data terminal equipment (1a) connected to the base station equipment (1).

In the time division multiple access radio data communication method, a common radio time slot (TS0) is allocated fixedly in order to carry out data communication between the data terminal equipment (1a) connected to the base station equipment (1) and a plurality of predetermined ones of the data terminal equipment (10a, 11a, 12a) which are connected to those of the out station equipment (10, 11, 12) which face the base station equipment (1), and then in a next communication sequence, data communication is carried out from the plurality of predetermined data terminal equipment (10a, 11a, 12a) connected to the out station equipment (10, 11, 12) to the data terminal equipment (1a) connected to the base station equipment (1).

That is, the plurality of predetermined data terminal equipment (10a, 11a, 12a) send out request to send signals (a0, a1, a2) at timings which do not overlap with each other, and the out station equipment (10, 11, 12) which receive the request to send signals (a0, a1, a2) sent out from the data terminal equipment (10a, 11a, 12a) send back, when the out station equipment (10, 11, 12) are ready to send out data signals to the base station equipment (1) using the common radio time slot (TS0) allocated thereto, clear to send signals (b0, b1, b2) to the data terminal equipment (10a, 11a, 12a) which have sent out the request to send signals (a0, a1, a2), whereafter the data terminal equipment (10a, 11a, 12a) which receive the clear to send signals (b0, b1, b2) sent back from the out station equipment (10, 11, 12) send out data signals to the out station equipment (10, 11, 12), and only the out station equipment (10, 11, 12) which receive the request to send signals (a0, a1, a2) sent out from the data terminal equipment (10a, 11a, 12a) send out the data signals sent out from the data terminal equipment (10a, 11a, 12a) to the base station equipment (1) using the common radio time slot (TS0) allocated thereto.

Accordingly, since the common radio time slot is allocated and used in order to carry out data communication between those data terminal equipment whose amount of data communication is low or those data terminal equipment whose data transmission amount is small or else those data terminal equipment by which data communication is carried out only periodically or intermittently, the radio time slot can be utilized efficiently. Further, the data terminal equipment connected to the base station equipment and an interface unit therefore can be realized in a small size.

The above and other objects, features, and advantages of the present invention will become apparent from the following description based on the accompanying drawings which illustrate examples of preferred embodiments of the present invention.

BRIEF DESCRIPTION OF THE DRAWINGS

FIG. 1 is a view illustrating a conventional time division multiple access radio data communication method, and wherein

FIG. 2 is a view illustrating an embodiment of a time division multiple access radio data communication method of the present invention, and wherein

DETAILED DESCRIPTION OF THE PREFERRED EMBODIMENTS

In the following, embodiments of the present invention are described with reference to the drawings.

Figure 1A:
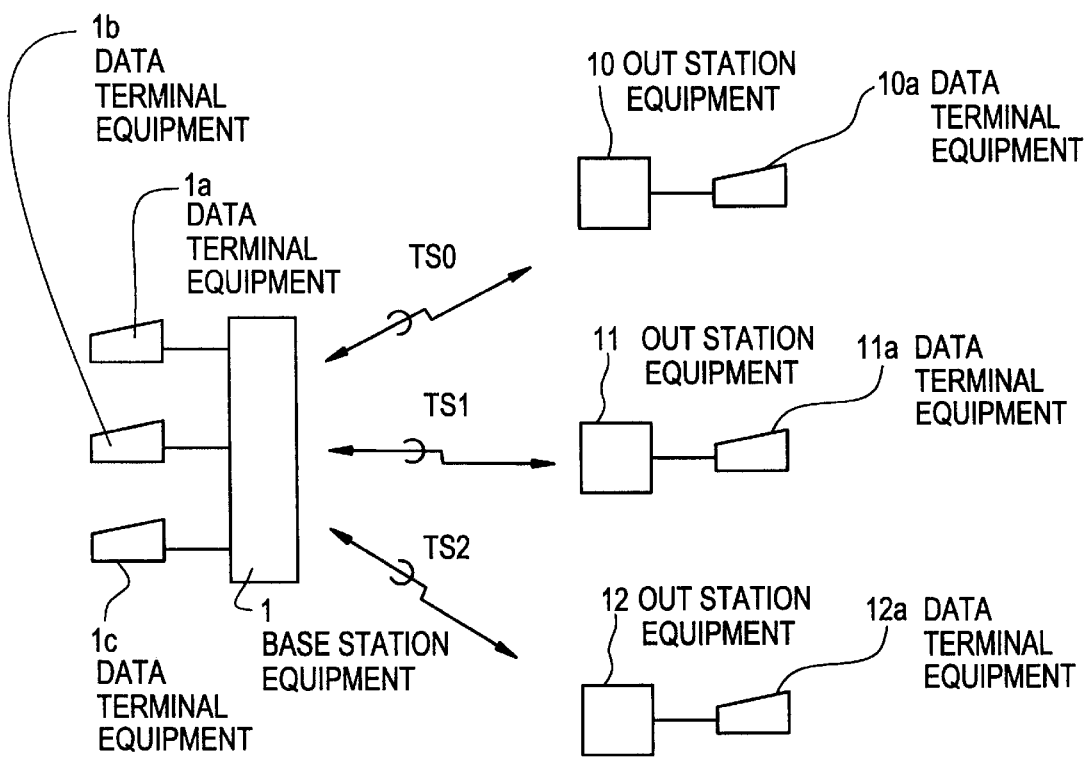
FIG. 1A is a block diagram showing a conventional example of a time division multiple access radio data communication system and FIG. 1B is a diagrammatic view illustrating a state of radio time slots of the conventional time division multiple access radio data communication system.
Figure 1B:
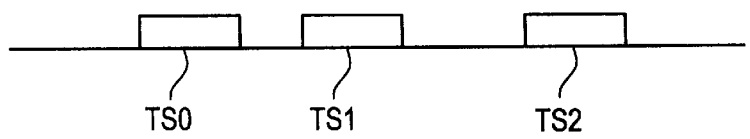
Figure 2A:
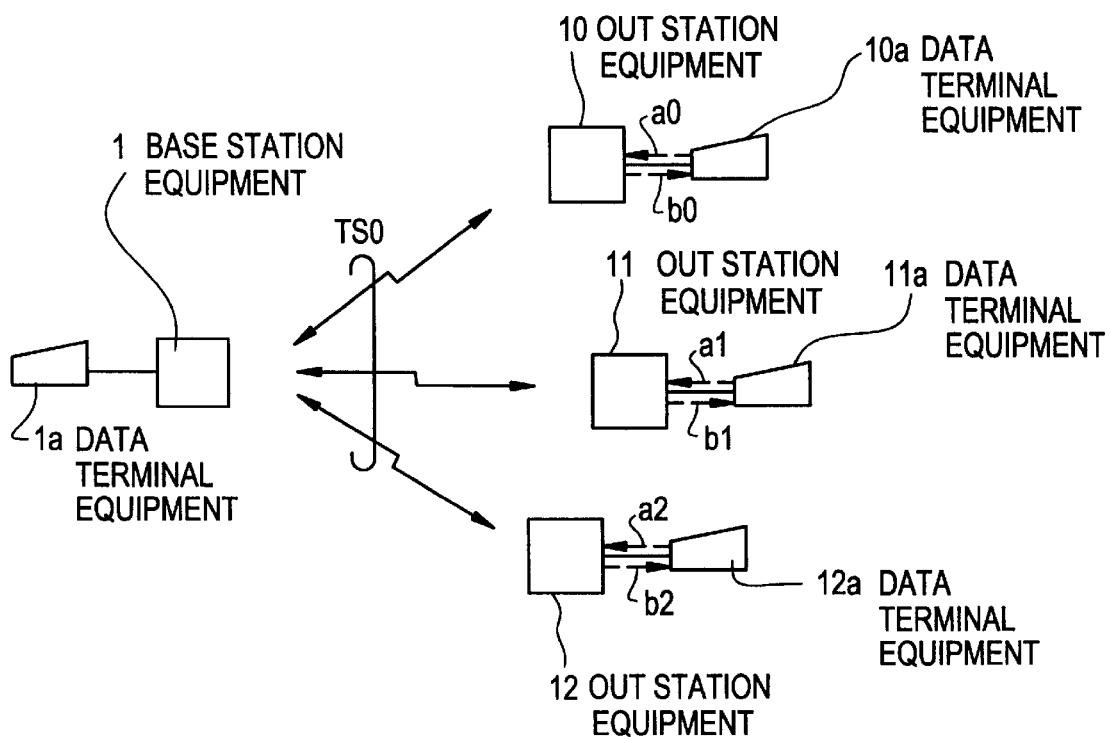
FIG. 2A is a block diagram of a time division multiple access radio data communication system to which the method of the present invention is applied and FIG. 2B is a diagrammatic view illustrating a state of a radio time slot allocated commonly to data communication between a plurality of data terminal equipment.
Figure 2B:
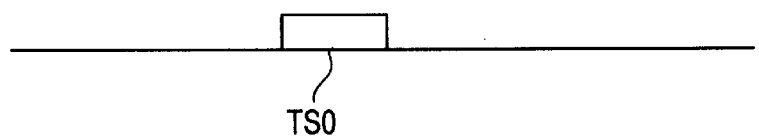
Figure 3:
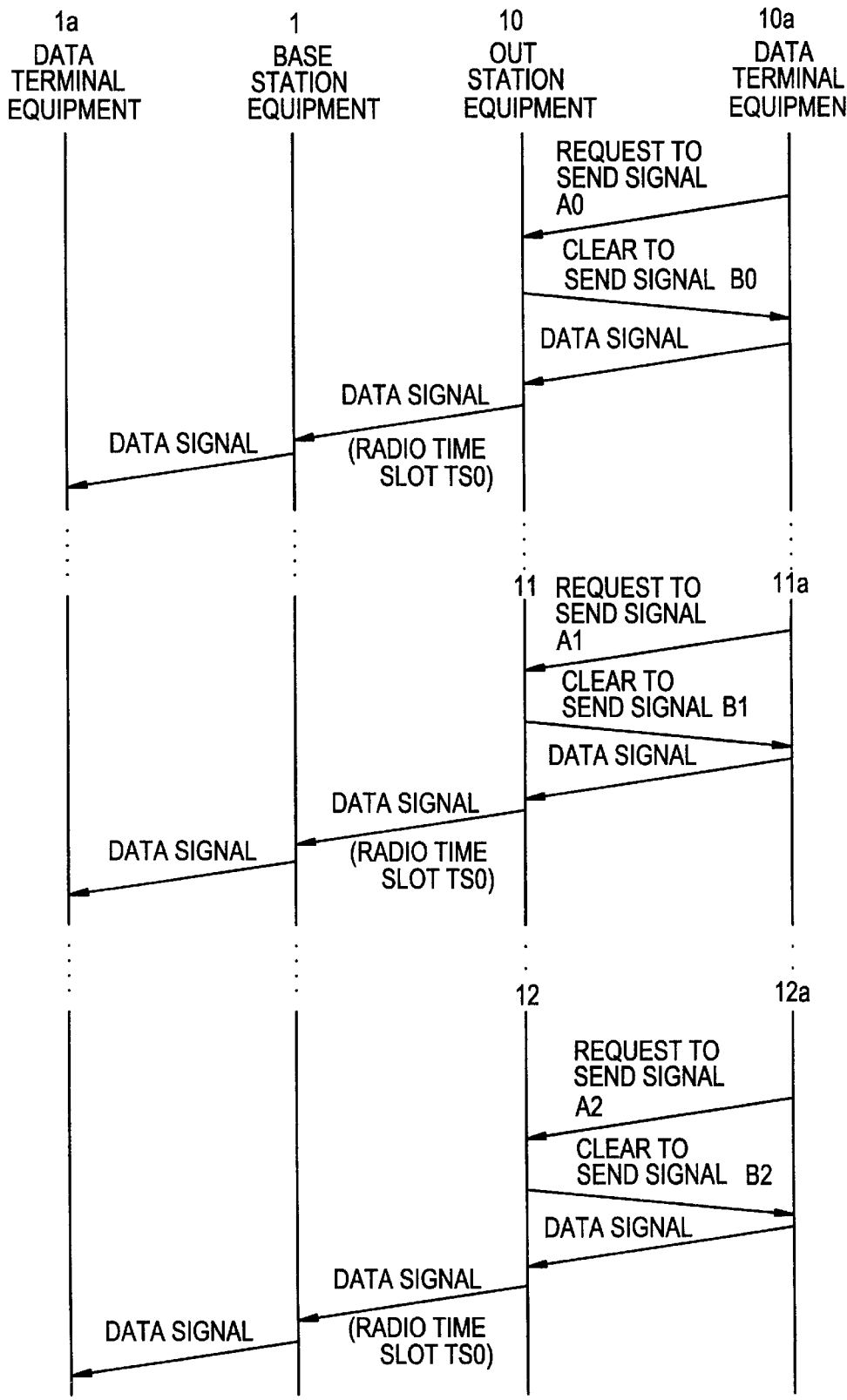
FIG. 3 is a communication sequence diagram illustrating the embodiment of FIG. 2.

FIG. 2 is a view illustrating an embodiment of a time division multiple access radio data communication method of the present invention, and wherein FIG. 2A is a block diagram of a time division multiple access radio data communication system to which the method of the present invention is applied and FIG. 2B is a diagrammatic view illustrating a state of a radio time slot allocated commonly to data communication between a plurality of data terminal equipment. FIG. 3 is a communication sequence diagram illustrating the embodiment of FIG. 2.

Referring to FIG. 2A, the communication system of the present embodiment includes base station equipment 1, data terminal equipment 1a connected to base station equipment 1, a plurality of out station equipment 10, 11 and 12 which face the base station equipment 1 with radio, and data terminal equipment 10a, 11a and 12a connected to out station equipment 10, 11 and 12, respectively. Similarly as in the conventional example, in the downward from the base station equipment to the out station equipment, data communication is carried out by the TDM method, and in the upward from the out station equipment to the base station equipment, data communication is carried out by the TDMA method. In the present embodiment, operation when data terminal equipment 1a and data terminal equipment 10a, data terminal equipment 11a and data terminal equipment 12a carry out data communication in a facing relationship therebetween is described.

First, when among a plurality of data terminal equipment connected to the out station equipment which carry out data communication with the data terminal equipment connected to the base station equipment, a plurality of data terminal equipment carry out data communication infrequently or with a small data transmission amount or carry out data communication only periodically or intermittently, a common radio time slot is allocated fixedly in advance in order to use it commonly for data communication between the data terminal equipment connected to the base station equipment and the plurality of data terminal equipment connected to the out station equipment. It is assumed that, in the present embodiment, the data terminal equipment connected to the base station equipment is data terminal equipment 1a, and the plurality of data terminal equipment connected to the out station equipment are data terminal equipment 10a, data terminal equipment 11a and data terminal equipment 12a. That is, for data communication between data terminal equipment 1a and data terminal equipment 10a, data terminal equipment 1a and data terminal equipment 12a, one radio time slot TS0 is allocated fixedly in advance. Then, as shown in FIG. 2B, data communication is carried out between data terminal equipment 1a and data terminal equipment 10a, between data terminal equipment 1a and data terminal equipment 11a and between data terminal equipment 1a and data terminal equipment 12a using only radio time slot TS0.

In data transmission in the downward, a data signal sent out from data terminal equipment 1a is inputted to base station equipment 1, by which it is multiplexed. Then, the multiplexed data signal is transmitted to out station equipment 10, out station equipment 11 and out station equipment 12 using the TDM method. That is, the data signal from data terminal equipment 1a is multiplexed for radio time slot TS0 and sent out to the individual out station equipment. It is to be noted that quite the same data signal is sent out to all of the out station equipment. Out station equipment 10, 11 and 12 demultiplex and selectively take out only the data signal multiplexed for radio time slot TS0 and send out the data signals to data terminal equipment 10a, 11a and 12a connected thereto, respectively. Thus, data terminal equipment 10a, 11a and 12a individually obtain the data.

The operation described above in connection with the data transmission in the downward is carried out, when a data signal is sent out from data terminal equipment 1a, irrespective of whether or not control signals such as a request to send signal or a clear to send signal accompany them.

Subsequently, data transmission in the upward is described with reference to FIG. 3. When the data terminal equipment connected to the out station equipment send out data signals, they send out request to send signals at timings which do not overlap with each other. That is, data terminal equipment 10a, 11a and 12a send out request to send signals a0, a1 and a2 at different timings from each other. When out station equipment 10, 11 and 12 which receive request to send signals a0, a1 and a2, respectively, are ready to send out data signals to base station equipment 1 using radio time slot TS0 allocated thereto, they send back clear to send signals b0, b1 and b2 to data terminal equipment 10a, 11a and 12a, respectively. Data terminal equipment 10a, 11a and 12a send out data signals after they receive clear to send signals b0, b1 and b2, respectively. Here, since data terminal equipment 10a, 11a and 12a send out request to send signals a0, a1 and a2 at different timings from each other, also the data signals are sent out at different timings from each other. Only one of the plurality of out station equipment which receives a request to send signal sent out from a corresponding data terminal equipment multiplexes a data signal sent out from the data terminal equipment in radio time slot TS0 set in advance and sends out the data signal as a burst signal to the base station equipment using the TDMA method. That is, after request to send signal a0 is sent out from data terminal equipment 10a to out station equipment 10 and clear to send signal b0 is sent back from out station equipment 10 to data terminal equipment 10a, a data signal is sent out from data terminal equipment 10a.

The data signal is multiplexed for radio time slot TS0 by out station equipment 10 and sent out to the base station equipment. Similarly, after request to send signal a1 is sent out from data terminal equipment 11a to out station equipment 11 and clear to send signal b1 is sent back from out station equipment 11 to data terminal equipment 11a, a data signal is sent out from data terminal equipment 11a. Further, after request to send signal a2 is sent out from data terminal equipment 12a to out station equipment 12 and clear to send signal b2 is sent back from out station equipment 12 to data terminal equipment 12a, a data signal is sent out from data terminal equipment 12a. Each of the data signals is multiplexed with radio time slot TS0 by out station equipment 11 or 12 and sent out to the base station equipment. Here, since the data signals from the individual data terminal equipment are sent out at different timings from each other, the data signals do not interfere with each other on radio time slot TS0 at all. Base station equipment 1 demultiplexes and takes outs the data signal from each of the out station equipment and sends out a corresponding data signal to the data terminal equipment connected thereto. That is, a data signal multiplexed for radio time slot TS0 is demultiplexed by base station equipment 1 and sent out to data terminal equipment 1a.

In the present embodiment, in order to prevent overlapping of timings at which data terminal equipment 10a, 11a and 12a which carry out data communication using the common radio time slot send out request to send signals, the timings at which data terminal equipment 10a, 11a and 12a send out the request to send signals are set in advance so that they may not overlap with each other.

Next, another embodiment of the present invention is described. In the present embodiment, data terminal equipment 1a connected to base station equipment 1 sends out a control signal for urging an arbitrary one of data terminal equipment 10a, 11a and 12a to send out a request to send signal. Then, after a request to send signal is sent out from the one data terminal equipment, data terminal equipment 1a sends out another control signal for urging another one of data terminal equipment 10a, 11a and 12a to send out a request to send signal. This communication sequence is repeated so that the timings at which the data terminal equipment which carry out data communication using the common radio time slot send out request to send signals may not overlap with each other. The other operations are similar to that of the preceding embodiment.

In the foregoing description, for convenience of description, it is assumed that, in FIG. 2A, the number of out station equipment is 3 and the number of data terminal equipment connected to the individual out station equipment is 1, and those circuits, signal lines and so forth which are not particularly significant are omitted.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A time division multiple access radio data communication method wherein:

in a time division multiple access radio data communication system which includes a single base station equipment, a plurality of out station equipment, and a plurality of data terminal equipment connected to said base station equipment and said out station equipment, and said communication system allows multiple access data communication, data signals are transmitted from the data terminal equipment connected to said out station equipment to the data terminal equipment connected to said base station equipment;

a common radio time slot is allocated fixedly in order to carry out data communication between the data terminal equipment connected to said base station equipment and a plurality of predetermined ones of said data terminal equipment which are connected to those of said out station equipment which face said base station equipment;

each of said plurality of predetermined data terminal equipment send out request to send signals to the out station equipment at timings which do not overlap with each other;

after receiving said request to send signal, if the out station equipment is ready to send out data signals to said base station equipment using said common radio time slot allocated thereto, it will send back clear to send signals to the data terminal equipment in response to the request to send signals;

then the data terminal equipment send out data signals to said out station equipment after receiving the clear to send signals from the out station equipment; and the out station equipment send out said data signals received from said data terminal equipment to the base station using said common radio time slot allocated thereto.

2. A time division multiple access radio data communication method as claimed in claim 1, wherein, in order to prevent overlapping of timings at which said plurality of predetermined data terminal equipment send out said request to send signals, the timing at which said data terminal equipment send out the request to send signals are set in advance so as not to overlap with each other.

3. A time division multiple access radio data communication method as claimed in claim 1, wherein, in order to prevent overlapping of timings at which said plurality of predetermined data terminal equipment send out said request to send signals, said data terminal equipment connected to said base station equipment sends out a control signal for urging an arbitrary one of said plurality of predetermined data terminal equipment to send out a request to send signal, and after a request to send signal is sent out from said one data terminal equipment, said data terminal equipment connected to said base station equipment sends out another control signal for urging another one of said plurality of predetermined data terminal equipment to send out a request to send signal, and this communication sequence is repeated.

4. A time division multiple access radio data communication method as claimed in claim 1, wherein said common radio time slot allocated fixedly is allocated to data communication between a plurality of ones of said data terminal equipment connected to said base station equipment and said data terminal equipment connected to those of said out station equipment facing said base station equipment which exhibit low efficiencies of utilization of radio time slots with said data terminal equipment connected to said base station equipment and the data terminal equipment connected to said base station equipment.

* * * * *